April 18, 1944. J. H. STEPHENS 2,346,797
LANDING GEAR
Filed April 16, 1941 3 Sheets-Sheet 1

Inventor
JOHN HARRIS STEPHENS,
By Harrison Beles
Attorney

April 18, 1944.　　J. H. STEPHENS　　2,346,797
LANDING GEAR
Filed April 16, 1941　　3 Sheets-Sheet 2

Inventor
JOHN HARRIS STEPHENS,
By  *Harmon Bates*
Attorney

April 18, 1944. J. H. STEPHENS 2,346,797
LANDING GEAR
Filed April 16, 1941 3 Sheets-Sheet 3
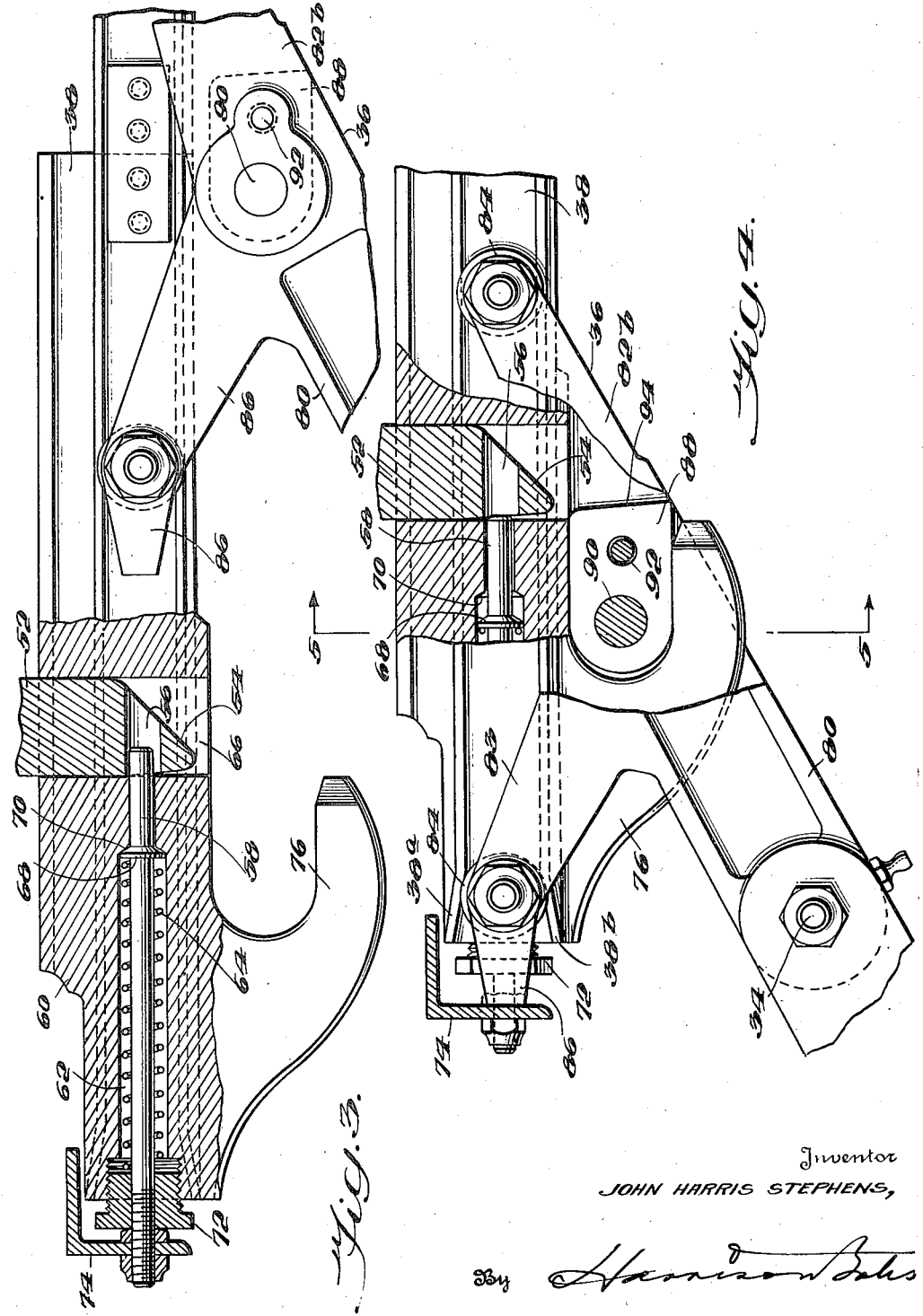
Inventor
JOHN HARRIS STEPHENS,
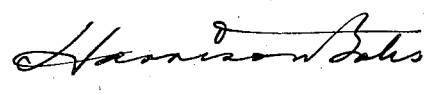
Attorney Patented Apr. 18, 1944

2,346,797

UNITED STATES PATENT OFFICE 2,346,797

LANDING GEAR

John Harris Stephens, West Chester, Pa., assignor to The Glenn L. Martin Company, Baltimore, Md.

Application April 16, 1941, Serial No. 388,789

12 Claims. (Cl. 244—102)

This invention is directed to retractable landing gear for aircraft. More particularly, the invention is directed to the construction of the landing gear, and to novel means for locking the landing gear in down position.

An object of the invention is to provide a novel support for the oleo strut of a retractable landing gear.

Another object of the invention is to produce a novelly braced landing gear which is fully retractable.

Another object of the invention is to produce a simple, lightweight landing gear and means for fully retracting the same.

Another object of the invention is to produce a novel mechanism for locking the landing gear in down position by reason of which drag stresses are taken away from the wheels of the carriage or trolley supporting a portion of the retracting mechanism.

Generally these objects of the invention are obtained by fitting the upper end of the oleo strut into a rotatable cross-beam supported between two fixed bearings. A hydraulically operated crank on one end of this cross-beam serves to rotate the cross-beam to retract the strut. A drag strut has one end attached to the oleo strut while the other end is supported by a trolley which slides upon a track. In the down position of the landing gear the trolley is effectively lifted from the track upon a fixed support and locked in place, thus eliminating the transfer of stresses through the trolley wheels to the track. The construction is quite simple, easily assembled and taken apart for maintenance purposes, and is effectively braced against the strains encountered during the landing of aircraft.

The means by which the objects of the invention are obtained are more fully disclosed in the accompanying drawings, in which:

Fig. 3 is an enlarged side view partly in section of the locking mechanism for locking the landing gear in down position;

Fig. 4 is a side view partly in section showing the trolley on the track in the down position;

Fig. 6 is a partial plan view of Fig. 4.

Figure 1:
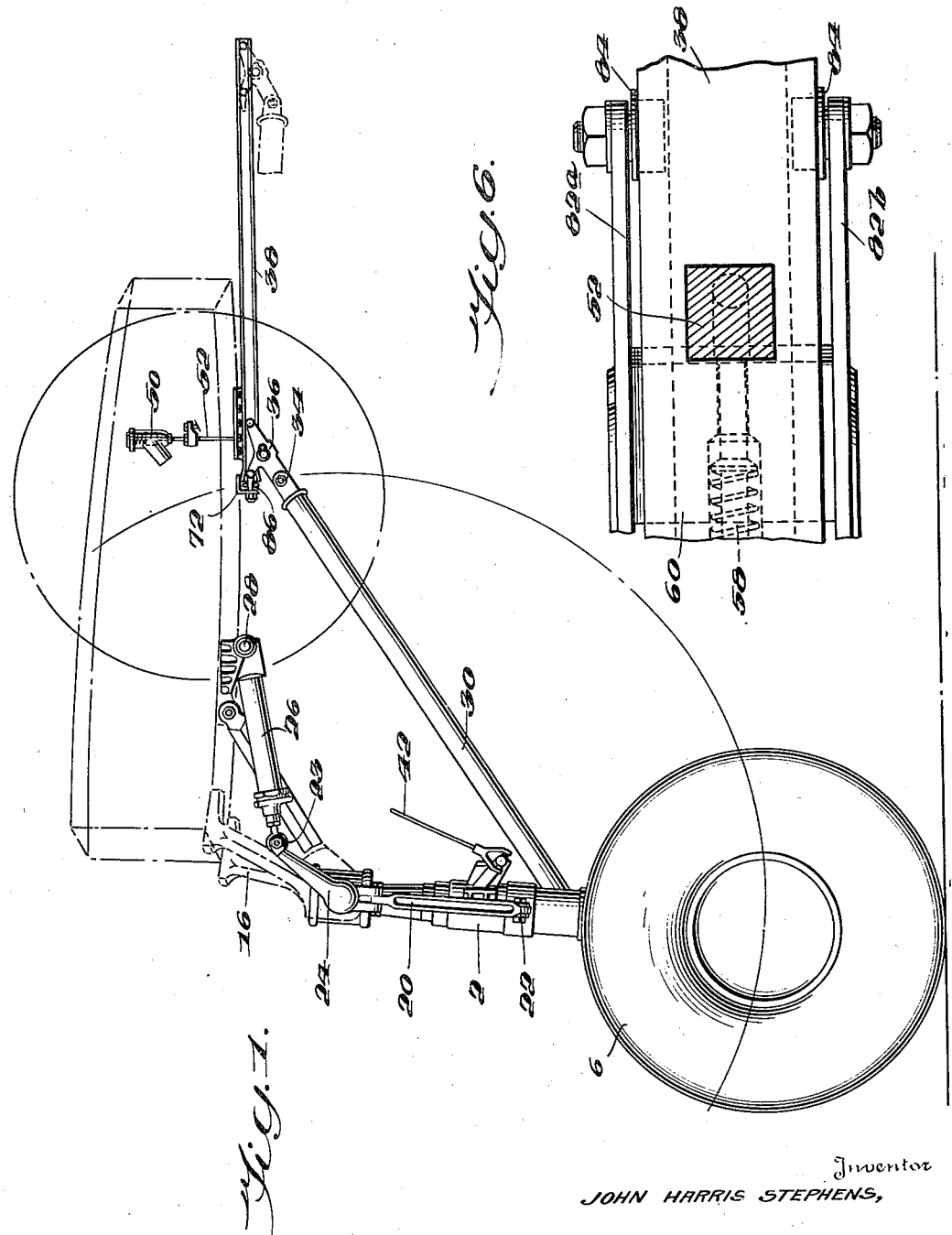
Fig. 1 is a side elevational view of the landing gear.
Figure 2:
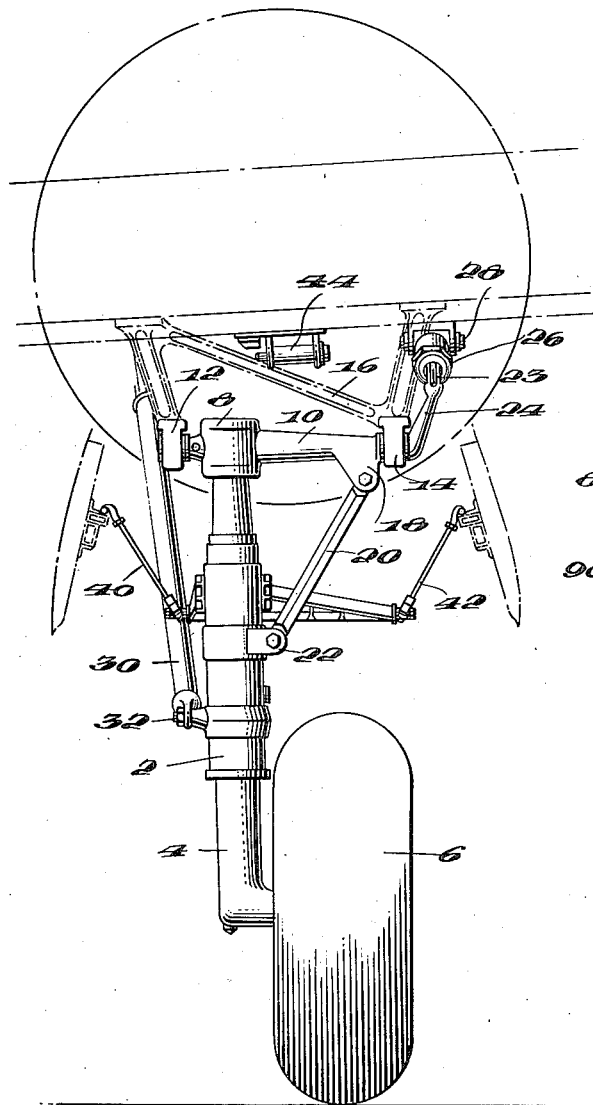
Fig. 2 is a front elevational view of the landing gear.
Figure 5:
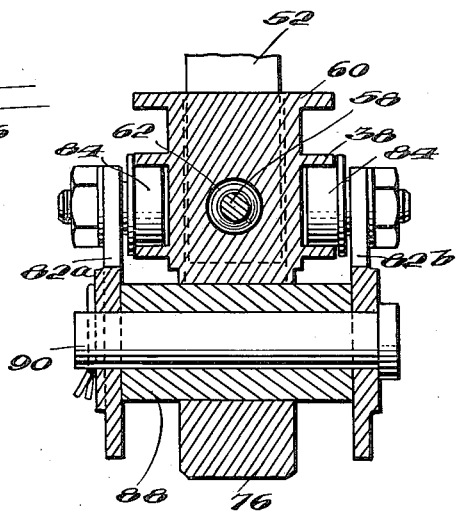
Fig. 5 is a cross-sectional view on the line 5—5 of Fig. 4.

The landing gear assembly as shown in Figs. 1 and 2 is composed of an oleo strut 2 from which an extensible arm 4 projects to hold the cantileverally supported wheel 6. The upper end of strut 2 is set in a joint 8 between the ends of a cross-beam 10, the ends of which are set in bearings 12 and 14, respectively. These bearings are located on the lowermost points of an N-shaped truss 16 which is fixed to the frame of the aircraft.

It is noted that joint 8 is located adjacent bearing 12. A fitting 18 adjacent bearing 14 supports one end of a brace 20, the lowermost end of which is attached to the strut 2 at 22. Consequently the strut 2 is firmly braced in its attachment to the cross-beam 10. By placing the joint 8 near the bearing 12, wheel 6 is located beneath cross-beam 10, thus producing compactness and strength.

Cross-beam 10 is rotatable in bearings 12 and 14. To effect such rotation one end of cross-beam 10 is pivotally joined at 23 to a crank 24 which is operatively connected to a hydraulically operating mechanism 26 of the conventional type, one end of which is attached to the frame of the aircraft by a pivotal connection 28.

A drag strut 30 is pivotally attached at its lower end 32 to strut 2 while its upper end is pivotally attached at 34 to a carriage or trolley 36 mounted upon a track 38 as will be later described.

Also attached to opposite sides of strut 2 are arms 40 and 42, respectively, for mechanically operating the trap doors which are pulled up to close the opening beneath the landing gear when it is in its retracted position. Also shown in Fig. 2 is the up position lock 44 mounted upon the aircraft frame, this lock engaging a lug or other means on strut 2 when the landing gear is in retracted position.

Because of the construction so far described, vertical shocks upon strut 2 are transmitted through cross-head 10 to truss 16 and distributed to the frame of the aircraft, while at the same time the use of the cross-head 10 permits a very simple means for rotating the strut into retracted position. It is clear that when the hydraulic mechanism 26 is operated the crank 24 will be rotated counterclockwise in Fig. 1 to cause the strut to move into its retracted position. During this operation, trolley 36 supporting the upper end of drag strut 30 is moved to the right hand side of track 38. By reason of brace 20, wheel 6 lies directly below cross-head 10 in the down position of the gear, while strut 2 is braced against twisting and transverse displacement.

When the landing gear is in down position the gear must be locked in position, and this is done by the down gear lock 50 shown generally in Fig. 1 and in more detail in Figs. 3 to 6, inclusive. A feature of this locking construction lies in relieving the wheels of the trolley 36 from the stresses produced upon drag strut 30 in landing and transmitted through the trolley to the track.

The down position lock 50 is composed of a hydraulic cylinder in which moves a piston normally urged downwardly by means of a spring. To this piston is connected a plunger 52, the lower end 54 of which is beveled and provided with a bore 56 adapted to receive a locking pin 58.

Track 38 is in the form of a double channel the flanges of which are trackways, and has a solid end portion 60 in which a bore 62 receives the pin 58 and a spring 64 urging the pin into locking position with the plunger 52, a vertical passageway 66 in portion 60 being aligned with plunger 52 for the reception of the same. At the end of the track, the track flange portions 38a and 38b are spread so that the distance between them is greater than the diameter of the wheels on the trolley.

Forward movement of the pin 58 is restricted by a flange 68 bearing against a shoulder 70 in the bore 62. The rear end of pin 58 passes through a plug 72 screwed in and closing the rear end of bore 62, and is united in any conventional manner to a cross-piece 74 which extends transversely beyond the sides of the trackway 38. Depending from solid portion 60 is a hook-like member 76 which functions to support the carriage or trolley as will be presently described.

The trolley or carriage 36 is composed of a solid arm 80 pivotally joined at 34 to drag strut 30. From member 80 two arms 82a and 82b extend to opposite sides of track 38, note Fig. 5. Each of these arms is substantially of Y-shape and has wheels 84 mounted at each free end of the Y, each wheel being supported by a shaft resting in an appropriate bearing in the end of its respective Y arm. The rearmost extending Y arm 83 is continued into a projection 86 which, as the carriage moves to the left, compare Figs. 3 and 4, contacts the cross-member 74 and moves it rearwardly.

Between the arms 86a and 86b a substantially rectangular block 88 is fastened by means of a shear pin 90. A second pin 92 passes through a bore in block 88 of greater diameter than the pin to prevent arms 82a and 82b from spreading and to hold block 88 in horizontal position but with sufficient movability so that it can adjust itself into the recess between tongue 76 and the bottom of section 60. The forward end 94 of block 88 is slightly beveled as shown in Fig. 4.

The operation of this locking mechanism is as follows: As the landing gear is moved to down position the trolley 36 moves to the left from the position shown in Fig. 3 to that of Fig. 4. The trolley when reaching the end of its travel brings the projection 86 into contact with the cross-member 74 and moves the cross-member together with the pin 58. As shown in Fig. 4 pin 58 is withdrawn from bore 56 in plunger 52 so that the plunger can move downwardly. At the same time it is noted that because of the flared flanges 38a and 38b on track 38, wheels 84 adjacent projection 86 are capable of being lifted from the track.

As the trolley is moved toward the left member 88 becomes firmly seated upon the hook-like member 76, it being noted that the plunger 52 exercises a wedging action against bevel face 94 of block 88 to force block 88 into the recess between tongue 76 and the bottom of section 60. In so being seated the trolley, including the wheels 84, is lifted from the track so that all stress transmitted by drag strut 30 to track 38 is through the hook member and the base of the track rather than through wheels 84. As member 88 is seated upon hook member 76 at the same time that pin 58 is withdrawn from hole 56 to release plunger 52, the plunger will fall downwardly and bear against the front face 94 of member 88 to lock the trolley in place.

When the landing gear is to be retracted, fluid pressure is applied to cylinder 50 to raise the piston therein and thus raise plunger 52 to unlock trolley 36. At the same time fluid pressure in cylinder 26 causes crank 24 to be actuated so that the landing gear starts to retract, and as the trolley 36 moves to the right, Fig. 4, the spring 64 pushes pin 58 to enter into hole 56 in plunger 52 to lock the plunger in its up position. As the plunger is locked in its up position, there is no chance of it dropping and preventing the trolley from moving into the full down position of the landing gear.

It is thus apparent that the invention provides a simple, compact, easily assembled, strong and well braced fully retractable landing gear, including a means for preventing stresses from being transmitted to the wheels of the trolley through the drag strut, and means for locking the trolley in the down position of the landing gear.

Having now disclosed the means by which the objects of the invention are obtained, I claim:

1. A retractable landing gear for aircraft comprising a rigid structure, an oleo strut adapted to carry a wheel, said strut being rotatably mounted on said structure, a retracting mechanism adapted to rotate said strut and wheel about an axis within said structure, a track-way mounted on said rigid structure, a drag strut, one end of said drag strut being adapted to ride on said trackway, the other end of said drag strut adapted to be pivotally secured to the said oleo strut at a point near the intersection of said oleo strut with a wheel, a load bearing structural member adjacent the said track-way in which a portion of said drag strut is wedged when the landing gear is in extended position, a locking element forming a part of said structural member, means rendered operative by the movement of said drag strut along said track-way, said locking element adapted to wedgedly secure the said drag strut to the said structural member when the landing gear is in down position, and means whereby said locking element is automatically disengaged by the operation of the retracting mechanism.

2. In a retractable landing gear for an airplane having the conventional oleo strut-supported wheel, a drag strut, a track adapted to receive and guide said drag strut retracting mechanism and an up-lock; a down-lock comprising a hook-like member adapted to receive a portion of said drag strut, said hook-like member which forms a part of the direct load bearing structure being rigidly secured to said track at the point of intersection of said track with a direct load bearing structure.

3. A retractable landing gear for aircraft comprising an oleo strut supported wheel, a drag strut, a track adapted to receive a portion of said drag strut, a retracting mechanism adapted to raise and lower said wheel by turning said wheel about an axis within the structure of the airplane, and a downlock adjacent said track and forming a part of the load bearing structure of the airplane, said down-lock adapted to receive and have securely wedged therein a portion of said drag strut and means rendered operative by movement of said drag strut along said trackway for wedging and locking said portion of said drag strut in said downlock structure.

4. A down-lock for airplane landing gears comprising a drag strut assembly, a track for guiding movement of said drag strut assembly, a load bearing structural member adjacent said track and adapted to receive a portion of said drag strut assembly when same is in down position, and means rendered operative by the drag strut assembly when riding on said track into said structural member for wedging and locking said drag strut assembly to said member whereby all stress in said drag strut is transmitted to said member and no stress is transmitted to said track.

5. A down-lock for airplane landing gears comprising a drag strut, a track for guiding movement of said drag strut assembly, a load bearing structural member secured to said track at a point adjacent the intersection of said member with said track and adapted to receive a portion of said drag strut when same is in the down position, and means rendered operative by the drag strut on entering said structural member for wedging and locking said drag strut to said member whereby all stress in said drag strut is transmitted to said member and no stress is transmitted to said track.

6. A down-lock for airplane landing gears comprising a drag strut, a track for guiding movement of said drag strut assembly, a load bearing structural member forming a part of said track and adapted to receive a portion of said drag strut when same is in the down position, means rendered operative by the drag strut when riding on said track into said structural member for locking said drag strut to said member independently of said track, and means for releasing said drag strut from said member.

7. A down-lock for airplane landing gears of the conventional retractable type comprising a drag strut, a track for guiding movement of said drag strut assembly, a structural member contiguous with said track adapted to receive a portion of said drag strut when the landing gear is in the extended position, and an automatic locking means forming a part of said structural member for wedging and rigidly securing the said portion of said drag strut to said structural member when the landing gear is moved into the down position, whereby the stresses in said drag strut are transmitted to said structural member, leaving said track free from drag strut stresses.

8. A down-lock for airplane landing gears of the conventional retractable type comprising a drag strut, a track for guiding movement of said drag strut assembly, a structural member reinforcing a portion of said track and forming a part thereof adapted to receive a portion of said drag strut when the landing gear is in the extended position, automatic locking means forming a part of said structural member for rigidly securing the said portion of said drag strut to said structural member when the landing gear is moved into the down position, and a means for releasing said locking means when it is desirable to retract the landing gear.

9. A down-lock for airplane landing gears of the conventional retractable type comprising a drag strut, a track for guiding movement of said drag strut assembly, a structural member supporting said track at one end thereof and adapted to receive a portion of said drag strut when the landing gear is in the down position, an automatic locking means forming a part of said structural member for wedgedly securing the said portion of said drag strut to said structural member when the landing gear is moved into the extended position, and a lock releasing means cooperating with the landing gear retracting mechanism for simultaneously releasing said down-lock when it is desired to retract the landing gear.

10. A down-lock for a landing gear of the fully retractable type comprising a track, a drag strut adapted to ride on said track, a main load bearing structural member forming an intersection with said track, said drag strut having a portion adapted to be wedged into said structural member adjacent the point of intersection of said track and said member, said structural member adapted to receive the said portion of said drag strut and locking means forming a part of said structural member and rendered operative by said drag strut for securing said strut portion to said structural member, and disengaging means for unlocking said locking means when it is desired to retract the landing gear, said disengaging means unlocking said locking means simultaneously and holding same in the unlocked position.

11. A down-lock for a landing gear of the fully retractable type comprising a track, a drag strut adapted to ride on said track, a main load bearing structural member secure to a portion of said track, said drag strut having a portion adapted to be wedged into said structural member, said structural member adapted to receive said portion of said drag strut and locking means forming a part of said structural member and rendered operative by said drag strut for securing said drag strut to said structural member, and disengaging means for unlocking said locking means when it is desired to retract the landing gear, said disengaging means for unlocking said locking means operated simultaneously with the retracting mechanism.

12. In the retractable landing gear for an airplane having the conventional oleo strut-supported wheel, a drag strut, a track for guiding said drag strut, retracting mechanism and an uplock; a downlock comprising a structurally reinforced section of said tract and a part carried by said drag strut adapted to ride into said reinforced section and be firmly wedged therein, a plunger for wedging and locking said part in said reinforced section, means for pressing said plunger towards its locking position, and a tripping mechanism forming a part of said reinforced section and arranged to release said plunger and wedge said part in said reinforced section, and means carried by the strut for operating said tripping mechanism as it moves along the track during the extension of the landing gear.

JOHN HARRIS STEPHENS.